United States Patent [19]

Clarke

[11] Patent Number: 4,623,224

[45] Date of Patent: Nov. 18, 1986

[54] ANASTIGMATIC EYEPIECE

[76] Inventor: Thomas L. Clarke, 5814 SW. 81 St., Miami, Fla. 33143

[21] Appl. No.: 422,214

[22] Filed: Sep. 23, 1982

[51] Int. Cl.[4] .................... G02B 25/00; G02B 9/04; G02B 9/12
[52] U.S. Cl. .................... 350/410; 350/477; 350/481
[58] Field of Search .................... 350/410, 477, 481

[56] References Cited
FOREIGN PATENT DOCUMENTS 108822  7/1982  Japan .................... 350/410

OTHER PUBLICATIONS

Cox, R. T.; "Gleanings for ATM's"; *Sky & Telescope;* vol. 22, No. 5; Nov. 1961; pp. 294–296.

*Primary Examiner*—John K. Corbin
*Assistant Examiner*—Scott J. Sugarman

[57] ABSTRACT

The invention is an eyepiece which is corrected for spherical aberration, coma, astigmatism, curvature of field, and longitudinal and lateral chromatic aberrations. The invention comprises a negative lens component, and two positive lens components, the components being spaced so that a real image is formed between the two positive components. Alternatively, the negative component and one positive component can be combined into a single thick positive component.

3 Claims, 2 Drawing Figures

ANASTIGMATIC EYEPIECE

BACKGROUND

An eyepiece is an optical system which, when used in conjunction with another optical system producing a real image (the objective), produces a real or virtual image at large distance from the eyepiece suitable for viewing by the eye, or for introduction into another optical system focused at large distance. The input pupil of the objective should be imaged into a location outside the eyepiece acessible to the eye or other system (e.g. diaphragm of a camera lens).

Eyepieces are subject to the same aberrations as other optical systems. These include the third order Seidel aberrations: spherical aberration, coma, astismatism, curvature of field, and distortion. In addition eyepieces exhibit longitudal and lateral chromatic aberrations due to the variation of the refractive index of glass with wavelength. Another aberration, unique to eyepieces, is spherical aberration of the pupil wherein the position of the image of the objective input pupil varies with field angle. The invention disclosed here succeeds in correcting the first four Seidel aberrations (hence it is an anastigmat) along with the chromatic aberrations and exhibits a very favorable pupil location.

SUMMARY

The invention comprises a negative lens nearest the objective followed by two positive lenses. The lenses are so positioned that the real image from the objective is reimaged between the two positive lenses. Correction of spherical aberration, coma and astigmatism are obtained by varying the shapes of the lenses. Correction of curvature of field is obtained by choosing the lens powers to satisfy the Petzval condition. Chromatic aberrations are corrected by varying the spacings between the lenses. Varying the distribution of power between the two positive lenses allows choice of pupil position, and choice of absolute power determines the focal length. Glass types may be varied to obtain more advantageous higher order aberration residuals as well as for reduction of distortion and spherical aberration of the pupil.

Even when all glass types are the same there is a family of eyepiece designs embodying this invention which are fully corrected for chromatic aberrations and which have zero Petzval sum. One simple design has focal lengths for its constituent lenses of $-1, 2$ and $2$ (measured in units of eyepiece focal length), and the lens separations are 2 and 4. The exit pupil is one unit beyond the final lens for a large ratio of eye distance to focal length. These numbers are based on thin lens theory and will differ for lenses with finite thickness.

This thin lens example can be extended to an entire family in which the ratio of exit pupil distance to focal length is a parameter. All members of this family have zero Petzval sum and are corrected for longitudinal and lateral chromatic aberrations. This family is characterized by a negative element of focal length $F1$ which is separated $-2F1$ from the next positive element which has focal length $F2$. The positive element nearest the eye has focal length $F3$ so that the Petzval sum is identically zero. If $e$ is the ratio of exit pupil distance to effective focal length, then the required separation of the positive elements is given by the solution of $$2S2^2 - (3 - 7e)S2F1 - 4(e-3)^2 F1^2 = 0$$

The focal length of the element nearest the eye is then given by $$F3 = 3S2/(3 + 2S2/F1 - e)$$

and the exit pupil distance by $$E = [d - 3/(2 - 3p)]/\{p[d - 3/(2 - 3p)] - 1\}$$

and $$F2 = -(F1 F3)/(F1 + F3),$$

where $d = -S2/F1$ and $p = [3 - 2d - e]/(3d)$.
The effective focal length is then $E/e$. These thin lens formula should be useful in finding preliminary designs for use as starting points in iterative optimization procedures.

A variant of the eyepiece summarized above uses a thick lens in place of the negative lens and the positive lens nearest the objective. Other variants consist in replacing either the negative lens, one of both of the positive lenses, or all lenses with doublets.

PREFERRED EMBODIMENT

Figure 1:
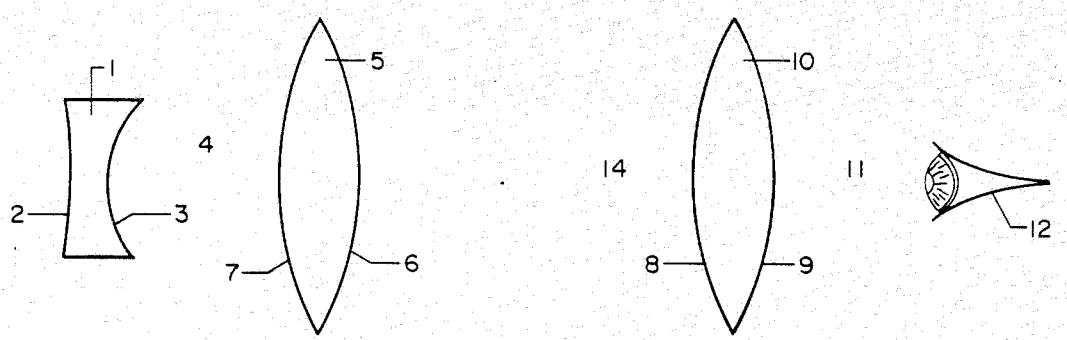
FIG. 1 is an optical diagram of the eyepice.

The preferred embodiment of the invention is shown in FIG. 1. The glass surfaces of lenses 1, 5 and 10, numbered 2, 3, 7, 6, 8 and 9 have radii denoted by the symbols R1, R2, R3, R4, R5 and R6 respectively. The axial thicknesses of lenses 1, 5 and 10 are denoted by the symbols T1, T2 and T3 and the sizes of the axial air spaces 4 and 14 are denoted by the symbols S1 and S2 respectively. The pupil located at the eye, 12, is axially separated from lens 10 by air space 11 with the magnitude denoted by symbol S3. It can be thought as a simple Barlow lens (negative lens) followed by a Huyghenian eyepiece (the two positive lenses). The lenses in the Huyghenian eyepiece are spaced further apart than is usual producing overcorrected lateral chromatic aberration. This overcorrection cancels the lateral chromatic aberration produced by the Barlow lens. The Barlow lens in turn produces overcorrected longitudinal chromatic aberration which cancels the longitudal aberration of the Huyghenian eyepiece. The negative Petzval sum of the Barlow in turn cancels the positive Petzval sum of the Huyghenian component. Making the first positive lens of the Huyghenian component of more dispersive glass than the other lenses changes the ratio of lateral to longitudal chromatic aberration in a favorable way and leads to designs with improved higher order aberrations.

A design based on these considerations has curvatures and spacings as defined in FIG. 1 given in the following table.

| Radius | Thickness | Spacing | Refractive Index | Abbe Number |
|---|---|---|---|---|
| R1 = −4.000 | | | | |
| | T1 = .300 | | N1 = 1.517 | V1 = 64.5 |
| R2 = .6667 | | | | |
| | | S1 = 1.100 | | |
| R3 = 2.000 | | | | |

| Radius | Thickness | Spacing | Refractive Index | Abbe Number |
|---|---|---|---|---|
| | -continued | | | |
| | T2 = .500 | | N2 = 1.649 | V2 = 33.8 |
| R4 = −2.000 | | | | |
| | | S2 = 2.240 | | |
| R5 = 2.000 | | | | |
| | T3 = .500 | | N3 = 1.517 | V3 = 64.5 |
| R6 = −2.000 | | | | |
| | | S3 = .948 | | |

This design has been raytraced and performs well at f/5 over a 40 degree field. Radii of curvature are defined as positive when they are convex to the incoming light. This design has an effective focal length of 1.03 and uses common crown and flint glasses. Some compromise has been made in order to use equal radii on all surfaces of the positive elements.

The use of glasses with higher refractive indices produces designs with better performance. The design in the following table has an effective focal length of 0.741. It uses more expensive glasses than the previous design and all the radii are different, but performance is better; a field of 45 degrees is usable at f/4.

| Radius | Thickness | Spacing | Refractive Index | Abbe Number |
|---|---|---|---|---|
| R1 = 1560 | | | | |
| | T1 = .200 | | N1 = 1.717 | V1 = 48.0 |
| R2 = .7798 | | | | |
| | | S1 = 1.900 | | |
| R3 = −.4025 | | | | |
| | T2 = .500 | | N2 = 1.805 | V2 = 25.4 |
| R4 = −2.012 | | | | |
| | | S2 = 2.900 | | |
| R5 = 1.912 | | | | |
| | T3 = .500 | | N3 = 1.717 | V3 = 48.0 |
| R6 = −5.736 | | | | |
| | | S3 = 1.476 | | |

Figure 2:
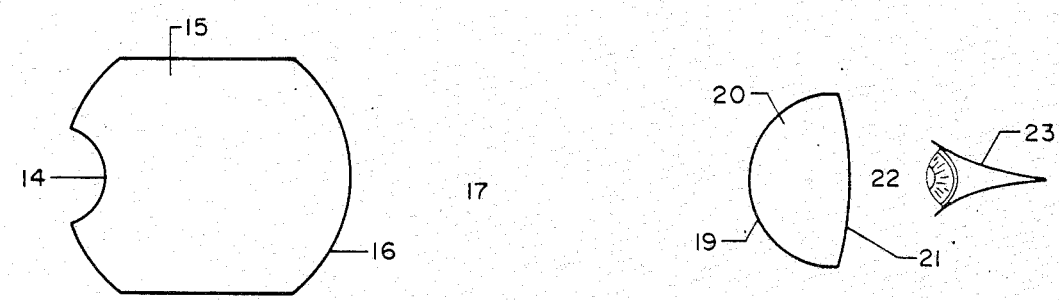
FIG. 2 is an optical diagram of the eyepiece in which two of the lenses have been replaced with a thick lens.

Variants of this invention consist making the first lens, the third lens, or both into doublets in order to decrease their effective dispersion. Another variant consists in combining the first lens and second lens into a single thick component as shown in FIG. 2. The glass surfaces of lenses 15 and 20, numbered 14, 16, 19 and 21 have radii denoted by the symbols R7, R8, R9 and R10 respectively. The axial thicknesses of lenses 15 and 20 are denoted by the symbols T4 and T5, and size of the axial air space 17 is denoted by the symbol S4, respectively. The pupil located at the eye, 23, is axially separated from lens 20 by air space 22 with magnitude denoted by symbol S5. Spacings and curvatures for such a design are given in the following table

| Radius | Thickness | Spacing | Refractive Index | Abbe Number |
|---|---|---|---|---|
| R7 = −1.273 | | | | |
| | T4 = 6.000 | | N4 = 1.670 | V4 = 47.1 |
| R8 = −3.954 | | | | |
| | | S4 = 15.00 | | |
| R9 = 2.695 | | | | |
| | T5 = 2.000 | | N5 = 1.670 | V5 = 47.1 |
| R10 = −8.088 | | | | |

| Radius | Thickness | Spacing | Refractive Index | Abbe Number |
|---|---|---|---|---|
| | -continued | | | |
| | | S5 = 2.400 | | |

This design has been ray traced and works reasonable well at f/8 over a 40 degree field. The effective focal length of ths design is 0.979.

I claim:

1. An eyepiece comprising a negative lens component nearest the objective and first and second positive lens components, said eyepiece being so designed as to substantially satisfy the equations, $$S1 = -2F1,$$

$$2S2^2 - (3-7e)S2F1 - 4[(e-3)F1] = 0,$$

$$F3 = 3S2/(3+2S2/F1-e),$$

and $$F2 = -F1F3/(F1+F3),$$

wherein the reference symbol F1 represents the equivalent focal length of the negative lens component, the symbol F2 and F3 represent the focal lengths of the first and second positive lens components respectively, the symbols S1 and S2 represent the axial air spaces between the negative and first positive and between the two positive lenses respectively, and e is a non-negative number that is substantially the ratio between the exit pupil distance and the effective focal length.

2. An eyepiece as in claim 1 in which the negative and the second positive lenses are made from materials of substantially the same optical dispersion, and in which the first positive lens is made from a material of substantially greater optical optical dispersion than the material from which the negative and second positive lenses are made.

3. An eyepiece comprising a thick lens component nearest the objective and a positive lens component, said eyepiece being so designed as to substantially satisfy the equations, $$T4 = -2NR7/(N-1),$$

$$2S4^2 - (3-7e)S4R7/(N-1) - 4 \cdot [(e-3)R7]^2/(N-1)^2 = 0,$$

$$F5 = 3S4/(3+2S4(N-1)/R7-e),$$

and $$R8 = -R7F5/(R7/(N-1)+F5),$$

wherein the reference symbols R7 and R8 represent the first and second radii of the thick lens component, the symbol F5 represents the focal length of the positive lens component, the symbol T4 represents the axial thickness of the thick lens component, the symbol S4 represents the axial air space between the thick lens component and the positive lens component, the symbol N represents the index of refraction of the material of the thick lens component, and e is a non-negative number that is substantially the ratio between the exit pupil distance and the effective focal length of the eyepiece.

* * * * *